Sept. 18, 1962
H. TORINO
3,054,395
HOT PLATE POT HEATER
Filed July 15, 1959
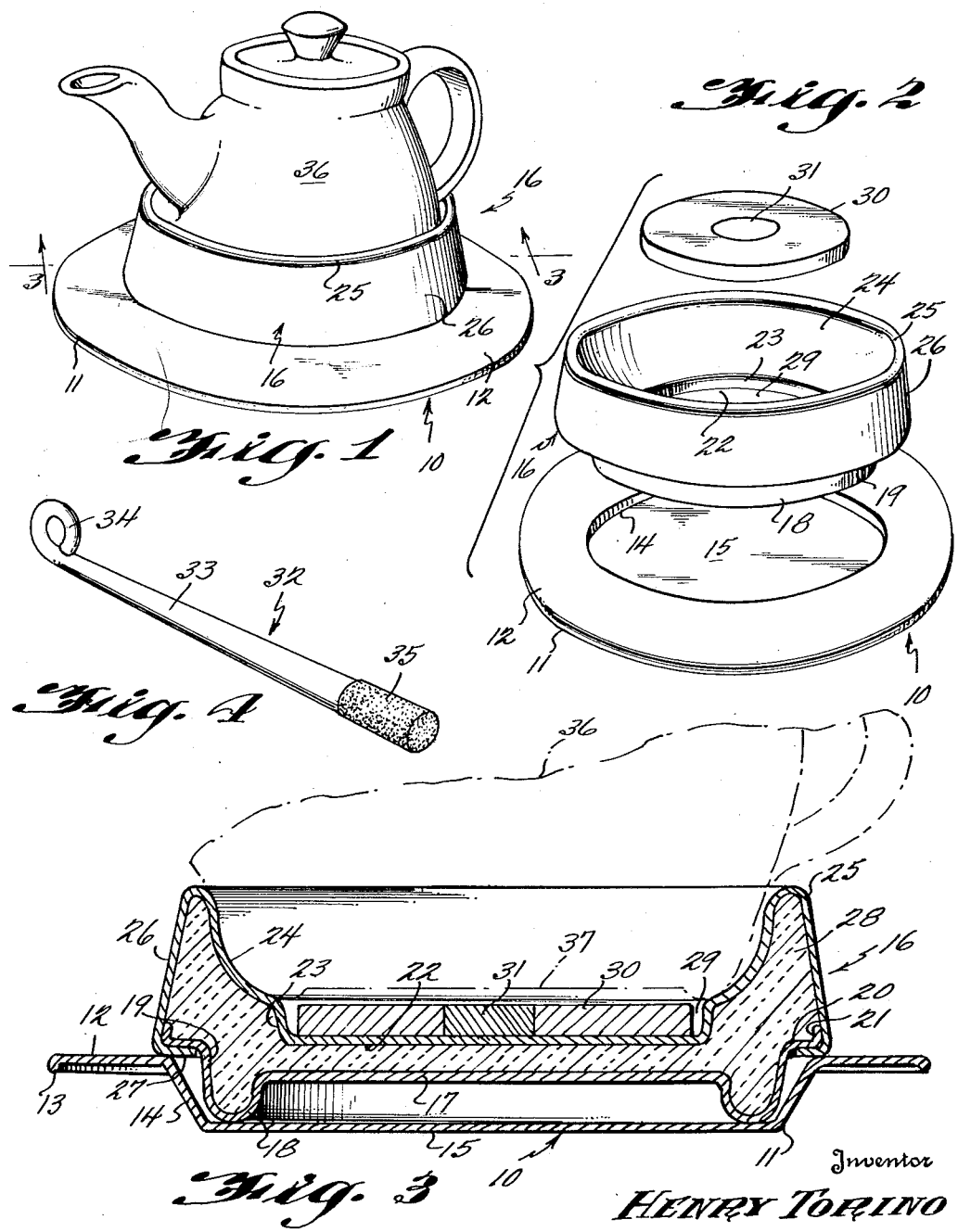
Inventor
HENRY TORINO
By
Kimmel & Crowell
ATTORNEYS

3,054,395
HOT PLATE POT HEATER

Henry Torino, Washington, D.C., assignor of one-half to Egidio Minuti, Philadelphia, Pa.
Filed July 15, 1959, Ser. No. 827,259
1 Claim. (Cl. 126—375)

The present invention relates to a hot plate pot heater of the type utilizing fireless heat-storing elements.

The primary object of the invention is to provide a hot plate pot heater in which the fireless heating element and the lower portion of the pot are supported within the confines of an insulating member.

Another object of the invention is to provide a hot plate pot heater of the class described above in which the insulating member supports the pot in spaced relation above the heating element.

A further object of the invention is to provide a hot plate pot heater in which an insulating member is provided with a depending integral support ring maintaining the insulating member in spaced relation above a supporting surface.

Other objects and advantages will become apparent in the following specification when considered in light of the attached drawings, in which:

FIGURE 1 is a perspective view of the invention with a pot shown in position thereon;

FIGURE 2 is an exploded perspective view of the hot plate pot heater;

FIGURE 3 is an enlarged transverse vertical section taken along the line 3—3 of FIGURE 1, looking in the direction of the arrows, with the pot shown in broken lines; and FIGURE 4 is a perspective view of the magnetic heating element handling tool.

Referring now to the drawings in detail wherein like reference characters indicate like parts throughout the several figures, the reference numeral 10 indicates generally a hot plate pot heater constructed in accordance with the invention.

The hot plate pot heater 10 includes a metallic plate 11 having a substantially flat annular rim 12 provided with a beaded peripheral edge 13. A downwardly and inwardly converging annular side wall 14 depends integrally from the inner edge of the rim 12 and has a circular bottom wall 15 integrally formed on the lower edge thereof. The bottom wall 15 is substantially parallel to the rim 12 and is offset therebelow.

An annular insulating support member, generally indicated at 16, is provided with a generally circular bottom wall 17 having a downwardly offset annular rib 18 integrally formed on the peripheral edge thereof. An annular side wall 19 is integrally formed on the rib 18 outwardly of the circular bottom wall 17 and has a relatively flat annular rim 20 integrally formed on the peripheral edge thereof. An upstanding annular flange 21 is integrally formed on the peripheral edge of the rim 20 and extends substantially perpendicularly upwardly therefrom.

A circular substantially flat inner wall 22 is arranged in axial alignment with the bottom wall 17 in spaced parallel relation thereabove. An annular upstanding side wall 23 is integrally formed on the peripheral edge of the inner wall 22 and extends upwardly therefrom oppositely of the bottom wall 17. A concave annular upper wall 24 is integrally formed on the upper edge of the side wall 23 and extends upwardly and outwardly therefrom. An inverted U-shaped top wall 25 of annular form is integrally secured to the upper edge of the upper wall 24 and extends outwardly therefrom. A downwardly and outwardly sloping outer wall 26 is integrally secured to the outer edge of the top wall 25 and extends downwardly and outwardly therefrom. An annular flange 27 is integrally formed on the lower edge of the outer wall 26 and extends radially inwardly therefrom in underlying and supporting relation to the rim 20, with the flange 21 engaging the lower inner edge portion of the outer wall 26.

Heat insulating material 28 of either a one-piece or comminuted structure completely fills the hollow space within the insulating member 16.

The inner wall 22 and the side wall 23 form a circular recess 29 extending below the confines of the concave upper wall 24. A circular heat retaining disk 30 is provided with a central magnetically attractable slug 31 and is arranged to be seated in the circular recess 29, as illustrated in FIGURE 3.

A tool, generally indicated at 32 in FIGURE 4, includes an elongated shank 33 having an eye 34 formed in one end thereof. A permanent magnet 35 is fixedly mounted on the shank 33 to provide means for detachably connecting the tool 32 to the magnetically attractable plug 31 in the heat retaining disk 30.

The heat retaining disks 30 can be moved about with the tool 32 without danger of burning the hands, due to the temperature of the disks 30.

The disks 30 are heated in a heating device (not shown) before they are placed in the circular recess 29 of the insulating member 16.

A conventional ceramic tea pot 36 is shown in full lines in FIGURE 1 and in broken lines in FIGURE 3. The tea pot 36 is supported on the concave upper wall 24 with the bottom 37 thereof spaced above the circular recess 29 and the disk 30 contained therein. The concave upper wall 24 is conformably shaped to the lower end portion of the circular wall of the teapot 36.

In the use and operation of the invention, a heated disk 30 is placed in the recess 29 by means of the tool 32 and the tea pot 36 containing hot water, or hot tea, is positioned, as illustrated in FIGURES 1 and 3, on the insulating member 16 so that the heated disk 30 will maintain the temperature of the tea pot 36 for a long period. The insulating member 16 serves as a neat decorative base for the tea pot 36 and has an attractive appearance when used as a part of a normal table service.

Having thus described the preferred embodiment of the invention, it should be understood that numerous structural modifications and adaptations may be resorted to without departing from the scope of the appended claim.

What is claimed is:

A teapot serving assembly comprising an upstanding teapot having a flat bottom and a circular wall rising from the perimeter of said bottom, the portion of said wall adjacent the lower end thereof being convexly curved, an insulating member disposed below and in supporting relation with respect to the lower end portion of said teapot wall, said insulating member comprising a hollow metallic shell having a circular bottom wall provided with a downwardly offset annular rib formed integral with the peripheral edge of said bottom wall, an annular side wall formed integrally with said rib, a relatively flat annular rim formed integrally with the peripheral edge of said side wall, an upstanding annular flange formed integrally with the peripheral edge of said rim, a circular substantially flat inner wall arranged in axial alignment with the bottom wall in spaced relation thereto, an annular upstanding side wall formed integrally with the peripheral edge of the inner wall, a concave annular upper wall conformably shaped to the lower end portion of said teapot wall and engaging at least a part of said teapot wall lower end portion, said member upper wall formed integrally with the upper edge of said side wall, an inverted U-shaped top wall formed integrally with the upper edge of the upper wall, a downwardly and outwardly sloping outer wall secured to the outer edge of the top wall, an annular flange formed on the lower edge of the outer wall in position in underlying and supporting relation to the rim with the flange engaging the lower inner edge portion of the outer wall, said member being provided with a circular recess below said teapot bottom, a heat retaining disk supported in said circular recess below said teapot bottom, and means for supporting said insulating member in spaced relation above a supporting surface.

References Cited in the file of this patent

UNITED STATES PATENTS

| | | |
|---|---|---|
| 189,412 | Wright | Apr. 10, 1877 |
| 2,830,576 | Torino et al. | Apr. 15, 1958 |